(No Model.) 2 Sheets—Sheet 1.

J. W. HILL.
MECHANICAL MOVEMENT.

No. 472,539. Patented Apr. 12, 1892.

Witnesses
W. C. Coclies
Martin H. Olsen

Inventor
John W. Hill
by Lysander Hill
his atty.

(No Model.) 2 Sheets—Sheet 2.
J. W. HILL.
MECHANICAL MOVEMENT.
No. 472,539. Patented Apr. 12, 1892.
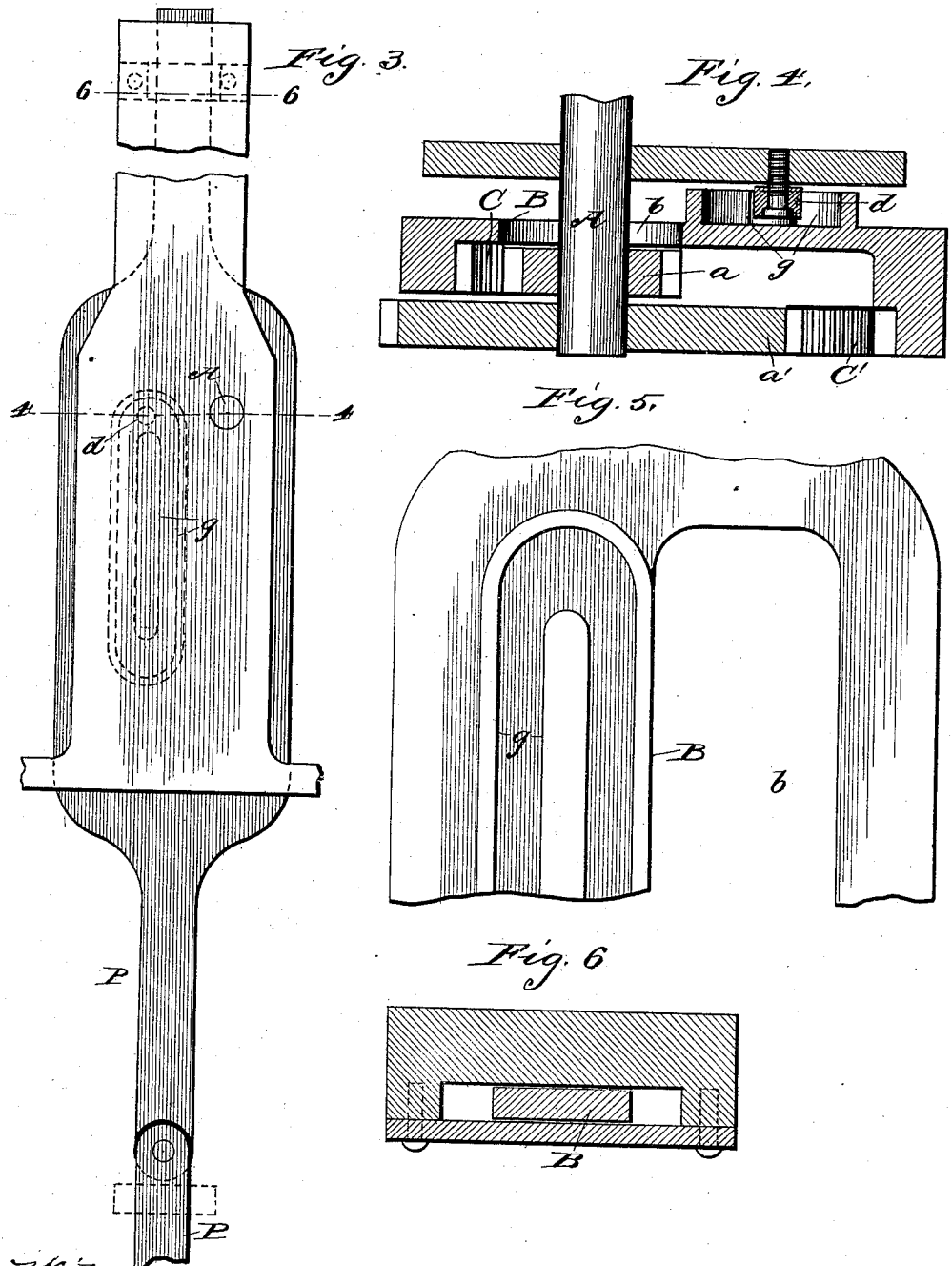

UNITED STATES PATENT OFFICE.

JOHN W. HILL, OF CHICAGO, ILLINOIS.

MECHANICAL MOVEMENT.

SPECIFICATION forming part of Letters Patent No. 472,539, dated April 12, 1892.

Application filed June 20, 1891. Serial No. 396,940. (No model.)

*To all whom it may concern:*

Be it known that I, JOHN W. HILL, a citizen of the United States of America, residing at Chicago, in the county of Cook and State of Illinois, have invented a certain new and useful Mechanical Movement, of which the following is a specification.

Figure 1:
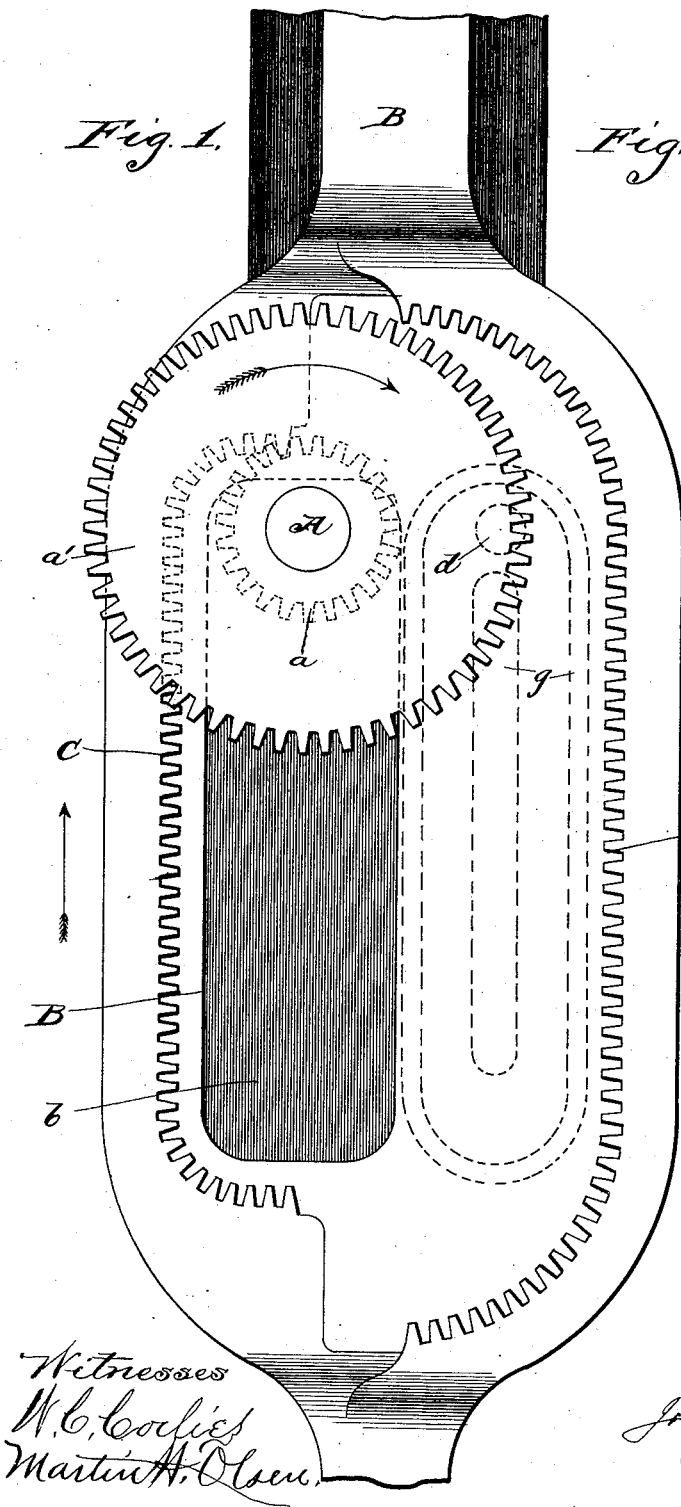
Figure 2:
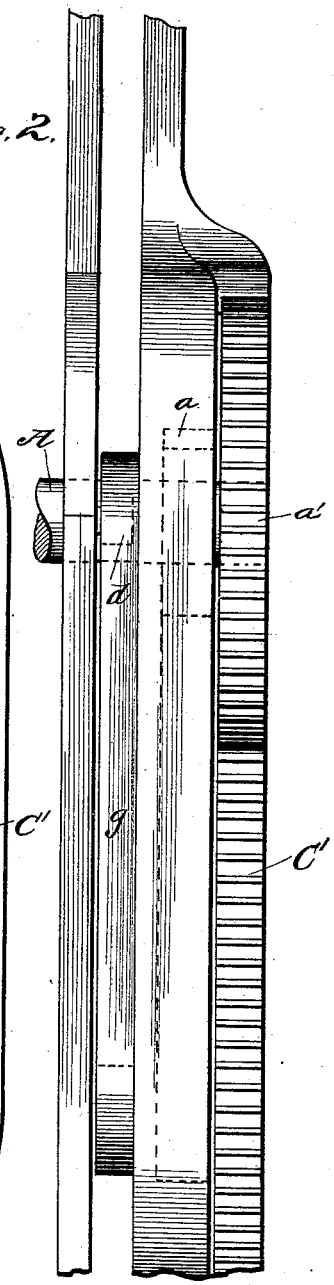

Referring to the accompanying drawings, wherein like reference-letters indicate like parts, Figure 1 is a front elevation; Fig. 2, a side elevation; Fig. 3, a rear elevation of mill-head and reciprocating yoke, reduced in size; Fig. 4, a horizontal section in line 4 4 of Fig. 3; Fig. 5, a partial rear elevation of reciprocating yoke, full size, of Fig. 1; Fig. 6, a horizontal section in line 6 6 of Fig. 3.

In various mechanical structures it is desirable in converting rotary into reciprocating motion to compel the driven member to execute in a given time a number of reciprocations that shall be greater or less than the number of revolutions executed by the driving member in the same time. It has also been found desirable in many mechanical structures to secure a slow powerful movement in one direction and a quick return, the machine doing its work in the one direction, as in iron-planers, certain shaping-machines, printing-presses, windmills for pumping water, and similar machines requiring a similar motion. These two results have already been accomplished, both separately and collectively, but by modes of operation involving mechanical devices and combinations that I consider not altogether satisfactory; and the object of my invention is to attain both results simultaneously by a new mode of operation and new mechanical devices free from the defects and limitations inherent in the old ones.

To this end I mount upon the driving-shaft two pinions of different diameters, and therefore having different peripheral velocities. I provide a guided reciprocating plate or yoke having an oblong opening through which the driving-shaft extends and having at one side of said opening a cog-rack, which engages with the small pinion when the plate or yoke is traveling in one direction and on the other side another cog-rack which engages with the large pinion when the plate or yoke is traveling in the reverse direction, the plate being so guided as to automatically shift the rack engagement from one pinion to the other at the ends of the stroke and being provided with means for connecting it to the pump-rod or other member which is to be reciprocated by the action of the driving-shaft. By this means I am enabled by simply varying the length of the yoke and its racks to increase to any desired extent the number of revolutions of the driving-shaft to each complete reciprocation of the driven member, and by varying the relative diameters of the two pinions I am able to move the driven member slowly with great and unvarying power in one direction and to move it with any desired speed in the reverse direction.

The principle of the invention consists in the new mode of operation, capable of affording the wide range of adjustments referred to and resulting from the combination of the two differential pinions with the double-rack yoke adapted to engage them alternately and to communicate the differential reciprocation thus obtained to the driven member or members.

In the accompanying drawings I have represented my invention as applied to a windmill to effect the reciprocation of a pump-rod by the action of the wind-wheel. In this form of embodiment and adaptation the wind-wheel shaft is shown at A, the two pinions at $a\ a'$, the slotted plate or yoke at B, connected to the pump-rod P by any suitable means and provided with an oblong central opening $b$, through which extends the shaft A, the two racks at C C', and the guide at $d\ g$. The two wheels $a\ a'$ are of course in different parallel planes. Hence the short rack, which engages the wheel $a$, must lie in the same plane with that wheel, and the long rack, engaging the wheel $a'$ for reversing the movement, must lie in the plane of wheel $a'$. The racks are curved at each end, so that the engaged wheel will at and near the end of its engagement cause the yoke to shift laterally to engage the other wheel. The guide consists, preferably, of a pin or stud $d$, projecting from a suitable part of the mill-head into a slot or groove $g$, formed in the yoke and having the necessary outline to keep the yoke to its proper engagements. The racks are so arranged and proportioned that whenever one of the wheels disengages from its rack the other simultaneously engages with the opposite rack.

It will be observed that the power given by each rack is uniform throughout its stroke, that the speed is therefore uniform throughout such stroke, and that the short rack, which is intended to give slow movement with great power, can be arranged to travel in a line very close to the driving-shaft by reducing the diameter of its pinion to the minimum, thus enabling the driving power to be uniformly applied with full maximum effect. These advantages, together with the wide range of variation of speed and power that can be effected in the back-and-forth movements by properly proportioning the pinions and their racks, and the certainty and positiveness of the entire operation, are of great practical importance and value.

Having thus described my invention, what I claim as new, and desire to secure by Letters Patent, is—

1. As a new mechanical movement, the combination of two differential driving-pinions revolving in the same direction, with a guided reciprocating yoke provided with two racks curved at their ends and adapted to engage alternately with the two pinions at opposite sides of their axes of revolution, substantially as described.

2. The combination of the differential pinions $a$ $a'$, mounted on the shaft A, the slotted and guided yoke B, and the racks C C', said members being arranged and adapted to cooperate in the manner and for the purposes substantially as herein set forth.

JOHN W. HILL.

Witnesses:
E. A. SHERBURNE,
FRANCIS E. DRESSER.